United States Patent
Dessing et al.

(10) Patent No.: US 12,171,363 B2
(45) Date of Patent: Dec. 24, 2024

(54) BEVERAGE BREWING APPARATUS WITH NOZZLE EXTERIOR CLEANING

(71) Applicant: KONINKLIJKE DOUWE EGBERTS B.V., Utrecht (NL)

(72) Inventors: Jacobus Petrus Maria Dessing, Nieuw-Vennep (NL); Koen Standaar, Soest (NL); Hendrik Johan Dees, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 266 days.

(21) Appl. No.: 16/612,348

(22) PCT Filed: May 9, 2018

(86) PCT No.: PCT/NL2018/050307
§ 371 (c)(1),
(2) Date: Nov. 8, 2019

(87) PCT Pub. No.: WO2018/208156
PCT Pub. Date: Nov. 15, 2018

(65) Prior Publication Data
US 2020/0170446 A1 Jun. 4, 2020

(30) Foreign Application Priority Data

May 10, 2017 (NL) ........................................ 2018884
May 10, 2017 (NL) ........................................ 2018886

(51) Int. Cl.
*A47J 31/60* (2006.01)
*A47J 31/46* (2006.01)
(Continued)

(52) U.S. Cl.
CPC ............... *A47J 31/60* (2013.01); *A47J 31/46* (2013.01); *B08B 3/08* (2013.01); *B08B 3/102* (2013.01);
(Continued)

(58) Field of Classification Search
CPC ............. A47J 31/60; B05B 15/50; B67D 1/07
See application file for complete search history.

(56) References Cited

U.S. PATENT DOCUMENTS 2,535,016 A * 12/1950 Launder ................. F16L 37/146
285/305
3,390,626 A 7/1968 Holstein et al.
(Continued)

FOREIGN PATENT DOCUMENTS

| AU | 2015202474 | 11/2015 | |
| CH | 707837 A1 * | 9/2014 | .............. A47J 31/60 |

(Continued)

OTHER PUBLICATIONS

Apple Rubber, How an O-Ring Works, Jan. 15, 2014, Apple Rubber. https://www.applerubber.com/hot-topics-for-engineers/how-an-o-ring-works/ (Year: 2014).*

(Continued)

*Primary Examiner* — Spencer E. Bell
*Assistant Examiner* — Omair Chaudhri
(74) *Attorney, Agent, or Firm* — Fitch, Even, Tabin & Flannery LLP

(57) ABSTRACT

An apparatus (900) is provided for the preparation of a beverage, including at least one beverage outlet nozzle (910) for discharging the beverage into a beverage container (940), characterized in that the apparatus includes a cleaning structure (100) for cleaning an exterior surface of the beverage outlet nozzle. With such cleaning structure, residues (Continued)

and ingredients of beverages may be removed from the exterior surface of the beverage outlet nozzle.

14 Claims, 5 Drawing Sheets

(51) Int. Cl.
  *B08B 3/08* (2006.01)
  *B08B 3/10* (2006.01)
  *B08B 9/023* (2006.01)
  *B08B 9/032* (2006.01)
  *B67D 1/07* (2006.01)

(52) U.S. Cl.
  CPC ............ *B08B 9/023* (2013.01); *B08B 9/0321* (2013.01); *B67D 1/07* (2013.01); *B67D 2210/00102* (2013.01)

(56) References Cited

U.S. PATENT DOCUMENTS

| | | | |
|---|---|---|---|
| 4,465,210 A | 8/1984 | Iwanami | |
| 5,865,221 A | 2/1999 | Ludwig | |
| 6,405,900 B1* | 6/2002 | Kown | B67D 1/0021 222/1 |
| 2003/0201337 A1* | 10/2003 | Carhuff | B67D 1/07 239/120 |
| 2006/0169717 A1* | 8/2006 | Fukushima | B67D 1/07 222/129.1 |
| 2006/0213928 A1* | 9/2006 | Ufheil | A47J 31/46 222/148 |
| 2009/0014464 A1* | 1/2009 | Adbelmoteleb | B67D 1/0028 222/1 |
| 2009/0293733 A1* | 12/2009 | Martin | A47J 31/60 99/280 |
| 2011/0023723 A1* | 2/2011 | Morin | B67D 1/07 99/323.3 |
| 2014/0251994 A1* | 9/2014 | Worth | A47J 31/60 220/87.1 |
| 2014/0283878 A1* | 9/2014 | Ooshiro | B05B 15/55 15/316.1 |
| 2015/0027315 A1 | 1/2015 | Lüssi | |
| 2015/0166319 A1* | 6/2015 | Kaneko | B67D 1/005 222/145.2 |
| 2017/0079464 A1* | 3/2017 | Apone | A47J 31/4496 |
| 2018/0111168 A1* | 4/2018 | Aneson | B08B 9/027 |
| 2019/0275550 A1* | 9/2019 | DeForest | B05B 15/52 |

FOREIGN PATENT DOCUMENTS

| | | |
|---|---|---|
| CN | 101980640 A | 2/2011 |
| CN | 102028412 A | 4/2011 |
| CN | 101980640 B | 1/2013 |
| CN | 105078240 A | 11/2015 |
| CN | 106604667 A | 4/2017 |
| DE | 20 2010 010 509 U1 | 10/2011 |
| DE | 202010010509 | 10/2011 |
| DE | 10 2012 104 843 A1 | 12/2013 |
| DE | 102012104843 | 12/2013 |
| DE | 102015104146 A1 * | 9/2016 |
| DE | 102015108438 A1 | 12/2016 |
| EP | 1 688 388 A1 | 8/2006 |
| EP | 2 594 174 A1 | 5/2013 |
| EP | 2594174 | 5/2013 |
| EP | 2 869 066 A1 | 5/2015 |
| EP | 2869066 | 5/2015 |
| JP | 2005523850 | 8/2005 |
| JP | 2008192047 | 8/2008 |
| JP | 2010533623 | 10/2010 |
| JP | 2012144269 | 8/2012 |
| JP | 2016078938 | 5/2016 |
| KR | 20070049703 A * | 5/2007 |
| RU | 2549060 | 4/2015 |
| WO | 03091152 | 11/2003 |
| WO | 2009012011 | 1/2009 |
| WO | 2011095511 | 8/2011 |
| WO | 2014154376 | 10/2014 |
| WO | 2016034592 | 3/2016 |

OTHER PUBLICATIONS

Matthew West. "Four-Bar Linkages", Sep. 5, 2016, https://web.archive.org/web/20161113225053/https://dynref.engr.illinois.edu/aml.html (or alternatively https://dynref.engr.illinois.edu/aml.html) (Year: 2016).*

International Search Report and Written Opinion, PCT/NL2018/050307 (Sep. 10, 2018).

International Search Report and Written Opinion, PCT/NL2018/050308 (Oct. 2, 2018).

* cited by examiner

BEVERAGE BREWING APPARATUS WITH NOZZLE EXTERIOR CLEANING

CROSS-REFERENCE TO RELATED APPLICATIONS

This application is a National Stage Application of PCT/NL2018/050307, filed May 9, 2018, which claims the benefit of and priority to Netherlands Patent Application No. NL 2018884, filed May 10, 2017, and Netherlands Patent Application No. NL 2018886, filed May 10, 2017, the entire contents of all three are hereby incorporated herein by reference.

TECHNICAL FIELD

The main aspect and various embodiments thereof relate to the field of apparatuses for preparing beverages and in particular to cleaning thereof.

BACKGROUND

Apparatuses for preparing beverages like coffee machines provide beverages in a fully automated way. The fully automated operation includes periodic cleaning of the apparatus after a particular amount of time, a particular amount of beverages discharged, or a combination thereof. During cleaning, a cleaning fluid is dispensed through the duct system of the device. The cleaning fluid may, for example be steam, heated water, atomised heated water, water with a detergent or soap in it, or a combination thereof. The cleaning fluid is generally discharged via a nozzle of the apparatus through which the beverage is normally discharged, though other outlets for the cleaning fluid may be provided as well. Whilst discharging cleaning fluid through a nozzle cleans the inside of the nozzle, the outside of the nozzle which is exposed to the atmosphere is untouched by the cleaning fluid and is often overlooked and therefore not cleaned. The outside of the nozzle may be contaminated with milk and other ingredients associated with the beverage, as well as other germs, dirt and bacteria which are in the atmosphere and to which the outside of the nozzle is exposed. Milk is a source for microbial growth and thus microbial contamination and is one of the known largest sources of microbial contamination in beverage machines. For these reasons, the outside of the dispensing nozzle is considered as one of the dirtiest and unhygienic areas of a beverage machine.

SUMMARY

While discharging the cleaning fluid through the nozzle through which the beverage is normally discharged, the internal duct system may be well cleaned. However, the outside of the nozzle is not cleaned and may remain contaminated with milk, sugar, other ingredients of beverages or a combination thereof. The main cause for such contamination is that during beverage making, the flow of beverage from the nozzle causes turbulence in the surrounding air which causes some beverage drops of the dispensed beverage to be drawn back towards the nozzle before reaching a cup/container. Such beverage drops contact the outside of the nozzle and thus contaminate it. The drops containing beverage ingredients may remain and eventually dry on the outside of the nozzle, or they may fall from the outside of the nozzle into a beverage cup/container below taking any other contaminants from the nozzle with them. The contaminants thus enter a fresh drink. In addition, some persons will bring their cup and beverage into contact with the nozzle when preparing a beverage. Proper cleaning of the outer surface of the nozzle is therefore necessary. With this consideration, an apparatus is provided for the preparation of a beverage, including at least one beverage outlet nozzle for discharging the beverage into a beverage container, characterized in that the apparatus includes a cleaning structure for cleaning an exterior surface of the beverage outlet nozzle.

Such a cleaning structure removes residues and ingredients of beverages from the exterior surface of the beverage outlet nozzle. In this way, cross contamination between beverages is prevented and microbial contamination is reduced. This is important, as soup residues in a cappuccino are not very tasty, sugar is usually not appreciated in a black coffee for a diabetes patient and a person with lactose intolerance does not want to have milk residues in het tea. For the reasons mentioned above, such issues may occur with existing coffee machines, irrespective of whether each beverage or single ingredient is discharged through a dedicated nozzle, or not. Further contamination of the nozzle also occurs when a beverage maker lifts the cup high enough so that that the beverage in the cup comes into contact with the outside of the nozzle. The aforementioned issues are addressed by the apparatus according to the invention.

In one embodiment of the invention, the cleaning structure is arranged to receive a cleaning fluid discharged from the beverage outlet nozzle. Inner ducts of coffee machines and other beverage processing apparatuses are commonly cleaned by providing a flow of a cleaning fluid through the inner ducts. In such cases, the cleaning fluid is discharged through the beverage discharge nozzle and in this particular embodiment the discharged cleaning fluid is used to clean the exterior of the beverage discharge nozzle.

In another embodiment of the invention, the cleaning structure is arranged to receive a cleaning fluid discharged from a cleaning outlet nozzle provided in the vicinity of the beverage outlet nozzle. An advantage of this embodiment is that a dedicated cleaning fluid may be used for cleaning of the exterior surface of the nozzle that is less suitable for inner ducts of the apparatus, but may be very effective for cleaning the exterior of the nozzle.

In a further embodiment of the invention, the cleaning structure comprises a fluid guidance structure, configured for guiding discharged cleaning fluid along the exterior surface of the nozzle when positioned at the nozzle. An advantage of this embodiment is that a discharge opening through which the cleaning fluid is discharged may be small; the larger surface of the exterior of the beverage discharging nozzle is cleaned by means of guided fluid.

In yet another embodiment of the invention, the fluid guidance structure comprises a nozzle receptacle for accommodating the beverage outlet nozzle. This allows the nozzle to be surrounded while guiding the cleaning liquid through the receptacle.

Yet a further embodiment of the invention comprises a flow shaping structure at the bottom of the nozzle receptacle. This allows optimal shaping of a flow of cleaning fluid along the nozzle exterior.

In yet another embodiment of the invention, the fluid guidance structure further comprises at least one cleaning fluid collecting inlet arranged to receive the cleaning fluid after passage along the exterior surface of the beverage outlet nozzle. This prevent uncontrolled spillage, or other discharge in the environment of the cleaning fluid.

In yet a further embodiment of the invention, a sealing module is arranged to provide a substantially fluid-tight seal between at least one of a housing of the apparatus and a part of the exterior surface of the beverage outlet nozzle spaced away from an outlet opening on one hand and the fluid guidance structure on the other hand, the sealing module thus forming at least part of the fluid guidance structure.

This allows a space to be created comprising the fluid guidance structure, a nozzle discharging cleaning fluid and the nozzle exterior through which the cleaning fluid may be efficiently guided without uncontrolled discharge into the environment of the apparatus.

In another embodiment of the invention, the apparatus includes a housing having at least one side wall, wherein the cleaning structure is movable, via an opening in the side wall from an idle location that is substantially within the housing, to an operating position, wherein the apparatus preferably includes a movable cover member for covering the opening when the cleaning structure is located in its idle location within the housing. In this way, the cleaning module in conveniently stored.

In a further embodiment of the invention, the cleaning structure is connected to a suspension arm via a first connecting arm and a second connecting arm, the first connecting arm is near a proximal end pivotally connected to an upper part of the suspension arm via an upper pivot point and near a distal end of the first connecting arm pivotally connected to a proximal end of the cleaning structure via a proximal pivot point and the second connecting arm is near a proximal end pivotally connected to a lower part of the suspension arm via a lower pivot point and near a distal end of the second connecting arm pivotally connected to a distal end of the cleaning structure via a distal pivot point. This embodiment provides an efficient driving movement of the cleaning module.

BRIEF DESCRIPTION OF THE DRAWINGS

The various embodiments of the invention will now be described, by way of example only, with reference to the following drawings in which.

DETAILED DESCRIPTION

Figure 1:
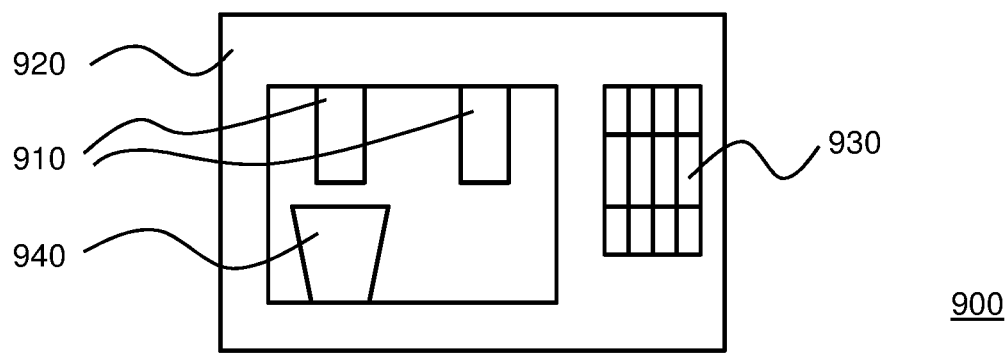
FIG. 1: shows a coffee machine.

FIG. 1 shows an apparatus for providing a beverage, such as a coffee machine 900. The coffee machine 900 comprises two beverage outlet nozzles 910 for discharging coffee into a cup 940 as a beverage container. The two beverage outlet nozzles 910 are provided in a housing 920 that houses a brewing compartment for brewing all kinds of coffee varieties with, or without milk or sugar, as well as tea, soup and other hot or cold beverages or a combination thereof. By means of the user interface 930, a user may select a beverage to be dispensed into the cup 940. The user interface 930 may comprise buttons, knobs, a touch screen, or other control means. In this embodiment, the two beverage outlet nozzles 910 are provided in a recess provided in the housing 920. Alternatively, the coffee machine 900 may comprise a protrusion, an overhang or another part for accommodating one or more beverage outlet nozzles 910 under which the cup 940 may be placed.

Figure 2:
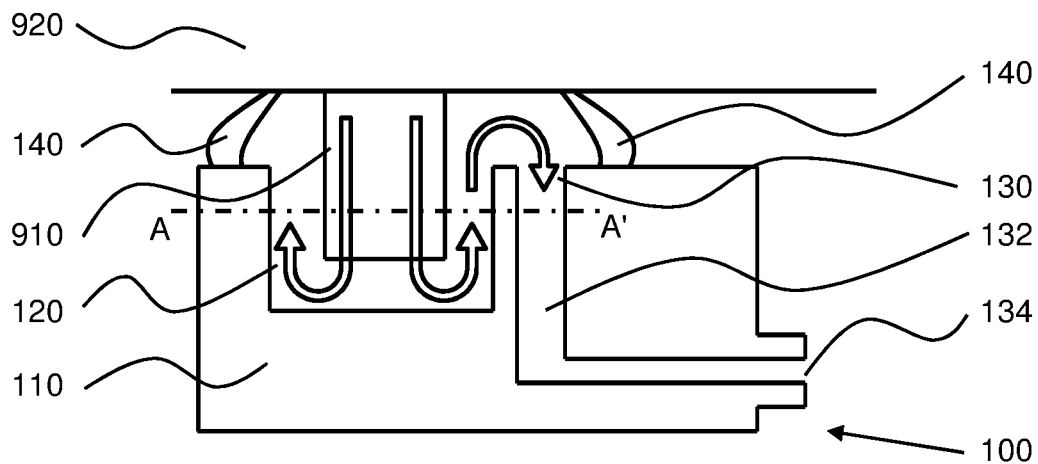
FIG. 2: shows a cross-section of a cleaning module.

FIG. 2 shows the beverage outlet nozzle 910 in further detail, protruding from the housing 920 of the coffee machine 900. The nozzle 910 is accommodated in a nozzle receptacle 120 provided in a cleaning module 100 that is comprised by the coffee machine 900. In this embodiment, the nozzle receptacle is provided as a blind hole in a cleaning housing 110 of the cleaning module 100. The nozzle receptacle 120 has an inner dimension that is larger than an outer dimension of the nozzle 910.

In a preferred embodiment, the nozzle 910 has circular cross-section, as well as the nozzle receptacle 120 and the outer diameter of the nozzle 910 is slightly smaller than the inner diameter of nozzle receptacle 120. The difference in diameter is preferably between 3 and 6 millimetres, with a particular preference for 5 millimetres. It is noted that the nozzle 910 as well as the nozzle receptacle 120 may have shapes other than circular.

It is preferred both the nozzle 910 and the nozzle receptacle 120 have the same shape in a cross-section in the plane A-A', but not required. Most relevant is that if the nozzle 910 is accommodated in the nozzle receptacle 120, one or more channels are available between the outer surface of the nozzle 910 and the inner surface of the receptacle 120. This may be a single channel, for example all around the outer surface of the nozzle 910, or multiple channels between location where the outer surface of the nozzle 910 is in contact with the receptacle 120.

In the position of the cleaning module 100 relative to the nozzle 910 as depicted by FIG. 2, fluid is allowed to pass from the outlet of nozzle 910, along the bottom of the receptacle 120 and through the channels as discussed directly above. While passing through the channels, the fluid is in contact with the outer surface of the nozzle 910. With the fluid being a cleaning fluid, this allows the outer surface of the nozzle 910 to be cleaned. Various cleaning fluids may be used, such as steam, heated atomised water, water comprising cleaning agents such as soap or detergents, liquid or vaporised organic agents, other, or a combination thereof. It is preferred the cleaning fluid used leaves no residues on or in the nozzle 910 that may end up in a beverage and may be harmful to a user of the coffee machine 900.

After leaving the nozzle receptacle 120, the cleaning fluid may leave the cleaning module 100 in any direction in which the fluid can flow, depending on available space and fluid characteristics. This may be an issue if the fluid may in any way be harmful for men, either on short term or on a longer term. An example of this is using steam or hot water as a cleaning fluid; escape of steam from the nozzle receptacle 120 in any direction may hurt a person standing next to the coffee machine 900. Therefore, efficient removal of the cleaning fluid is desired and for that purpose, a cleaning fluid collecting inlet 130 is provided in the cleaning module 100 for collecting cleaning fluid flowing out of the nozzle receptacle 120.

The collecting inlet 130 is preferably provided in the housing 110 of the cleaning module 100, but may also be provided externally from the housing. In the case in which the collecting inlet 130 is provided in the housing 110, the housing 110 comprises a cleaning fluid collecting channel 132 that leads to a cleaning fluid collecting outlet 134 that may be connected to a duct for leading recuperated cleaning fluid to a reservoir (not shown). The used cleaning fluid in the reservoir may be removed later or re-used for subsequent cleaning.

Whereas a liquid as a cleaning fluid may flow along an upper side of the housing 110 of the cleaning module 100 to the collecting inlet 130, steam or another vapour or gas may flow towards the environment surrounding the coffee machine 900 in which case it may still be harmful to any people. In order to improve guidance of the cleaning fluid flowing from the nozzle receptacle 120 towards the collecting inlet 130, a preferably resilient spacer 140 is provided around the nozzle receptacle 120 and the collecting inlet 130.

While the cleaning module 100 is moved such that the nozzle 910 is accommodated by the nozzle receptacle 120, the spacer 140 may ensure that the outlet end of the nozzle 910 does not touch the bottom of the nozzle receptacle 120, thus ensures the outlet end of the nozzle 910 is not closed off.

This is arranged by the spacer 140 abutting the housing 920 of the coffee machine 900 if the cleaning module 100 is at the preferred cleaning position relative to the nozzle 910. It is noted other, alternative or additional, measures may be taken to address this issue. Furthermore, in particular if the spacer 140 is resilient, the spacer 140 may be arranged to seal off a space between the housing 920 and the cleaning housing 110 in which the nozzle receptacle 120 and the collecting inlet 130 are provided.

In a preferred embodiment, the resilient spacer 140 may be arranged such that increased pressure in said space results in the resilient spacer 140 such that sealing is improved. In such preferred embodiment, at least a part of the resilient spacer 140 is placed on the cleaning housing under an angle more than 90° relative to the housing 920, relative to the part at which the nozzle 910 is located. Increased pressure in the space defined by the housing 920, the spacer 140 and the cleaning housing 110 will in this configuration result in the spacer being pressed against the housing 920, thus providing a wider seal.

Whereas the sealing has been discussed as being provided between the spacer and the housing 920, sealing may also be provided between the cleaning housing 110 and the nozzle 910. In this embodiment, the spacer 140 seals a space between the nozzle 910 and the upper part of the cleaning housing 110 such that it comprises at least an exterior of the nozzle 910 in the vicinity of the outlet of the nozzle 910.

Figure 3:
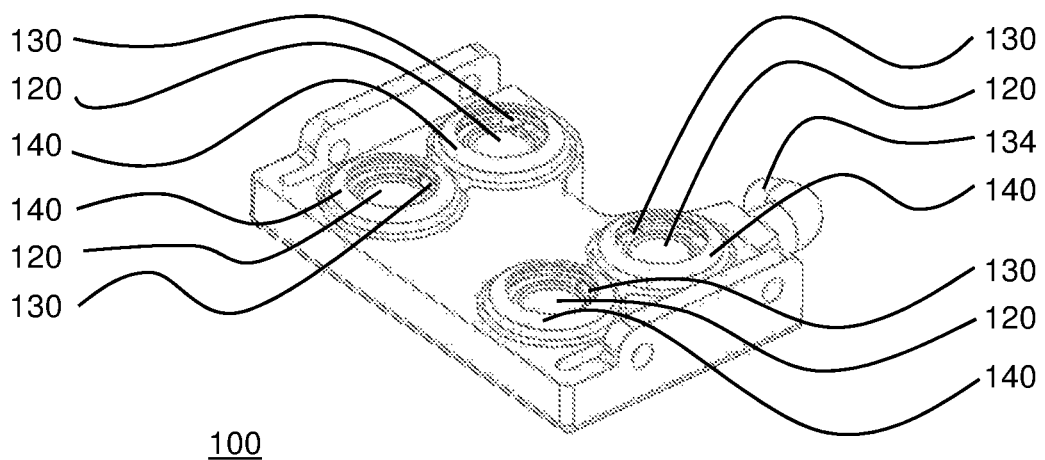
FIG. 3: shows an isometric view of the cleaning module.

FIG. 3 shows the cleaning module 100 in isometric view. In the embodiment shown in FIG. 3, the cleaning module 100 is arranged for a coffee machine 900 having four nozzles. Each nozzle may be dedicated to a specific beverage or a specific ingredient to reduce cross-contamination of ingredients or beverages. In this embodiment, the nozzle receptacles 120 have circular shapes, provided as blind holes in the cleaning housing 110. The collecting inlets 130 are distributed along the periphery of the nozzle receptacles 120 and preferably annularly equidistantly distributed around the nozzle receptacles 120. Around each nozzle receptacle 120, one, two, three, four or more collecting inlets 130 may be provided having a circular, rectangular, elliptical, oval shape, other shape or a combination thereof. The resilient spacers 140 are provided as rings around the nozzle receptacles 120 and the collecting inlets 130.

Figure 4:
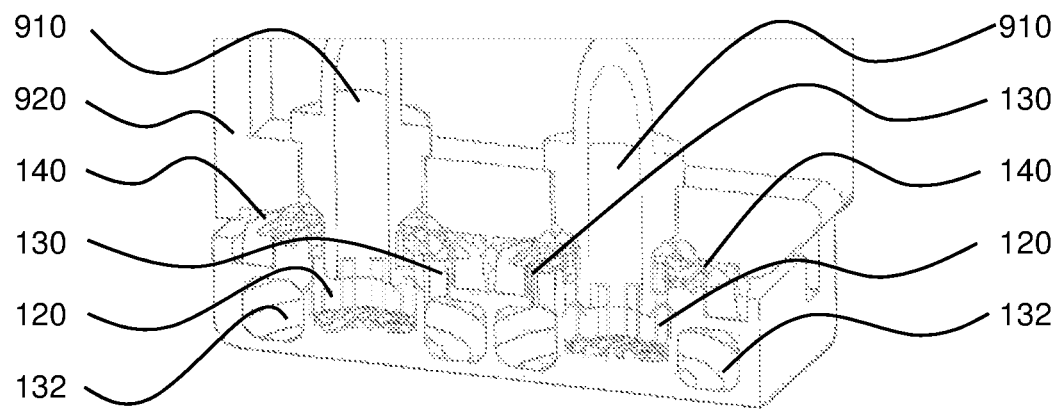
FIG. 4: shows an isometric cross-section view of the cleaning module.

FIG. 4 shows an isometric view of the constellation as schematically depicted by FIG. 2. In the configuration shown by FIG. 4, the coffee machine 900 has two nozzles 910 provided in the housing 920 and the cleaning module 100 comprises two nozzle receptacles for receiving the nozzles 910 for cleaning the exterior surface of the nozzles 910 in the vicinity of the nozzles outlets. The cleaning fluid collecting channels 132 are provided wide relative to the collecting openings 130 to ensure swift removal of used cleaning fluid.

Figure 5:
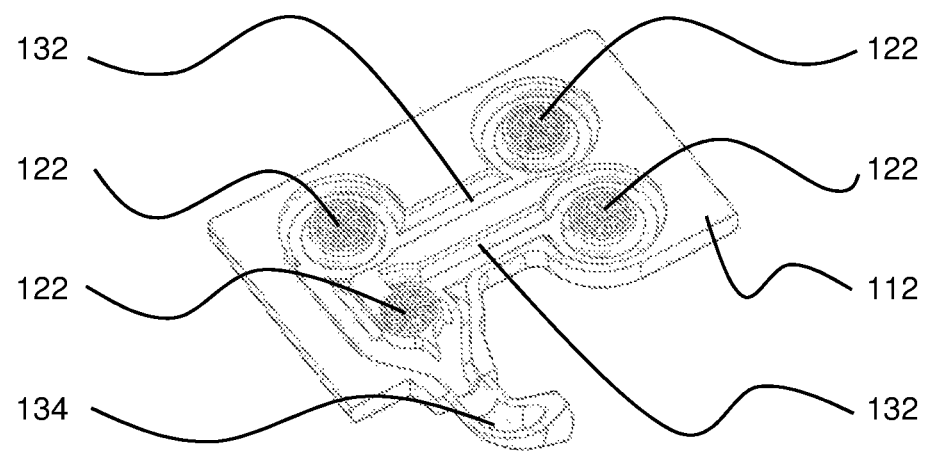
FIG. 5: shows an isometric view of a bottom part of the cleaning module.

FIG. 5 shows an isometric view of a lower cleaning housing part 112 of the cleaning housing 110. FIG. 5 shows the cleaning fluid collecting channels 132 ranging from the nozzle receptacles 120 to the cleaning fluid collecting outlet 134. Also visible in FIG. 5 are flow shaping structures 122 at the bottoms of the nozzles receptacles 120. The flow shaping structures 122 comprise curved ridges ranging from the bottom of the nozzles receptacles 120 to the outer periphery of the nozzles receptacles 120. The ridges may have a triangular cross-section having a shape of an isosceles triangle, a right triangle or any other triangle. If the shape is that of a right triangle, the substantially vertical wall may be directed to either the concave or convex side of the curve. Alternatively or additionally, spiralling structure may be provided at the walls of the receptacles 120.

The cleaning module 100 has been discussed as the nozzle 910 being received by the nozzle receptacle 120. Whereas such configuration is advantageous for cleaning the outer surface of the nozzle 910, it prevents discharge of a beverage from the nozzle 910 in the cup 940. Therefore, the cleaning module 100 is preferably movable relative to the nozzle 910. In another embodiment, the nozzle 910 is movable relative to the cleaning module 100 and in yet another embodiment the cleaning module 100 and the nozzle 910 may both me moved from and to the position as depicted by FIG. 2 and FIG. 4.

Figure 6:
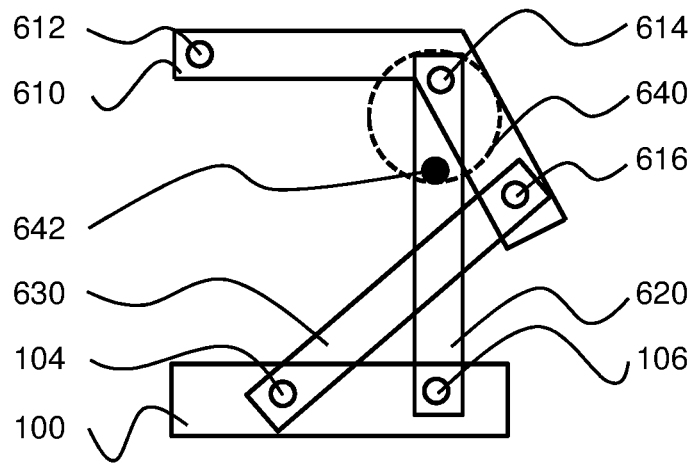
FIG. 6A: shows a cleaning module movement system with the cleaning module in operating position.
FIG. 6B: shows the cleaning module movement system with the cleaning module in idle position.
Figure 6:
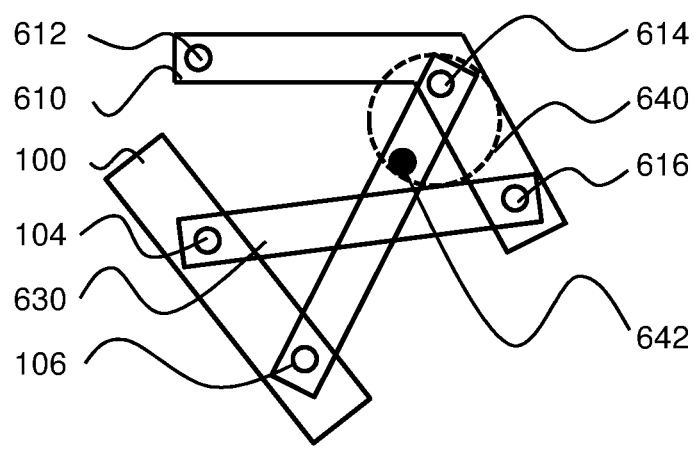

FIG. 6A shows the cleaning module 100 suspended in a cleaning module movement system 600 comprised by the coffee machine 900. In the constellation as shown by FIG. 6A, the cleaning module 100 is in an operational state in which it is arranged for cleaning the exterior surface of the nozzles 910 (for the sake of clarity not shown in FIG. 6A).

The cleaning module movement system 600 comprises a suspension arm 610 that is preferably pivotally suspended in the coffee machine 900 via a suspension joint 612. To the suspension arm 610, a first connecting arm 620 and a second arm 630 are connected. The first connecting arm 620 and the second connecting arm 630, in turn, are connected to the cleaning module 100.

The first connecting arm 620 is pivotally connected to the suspension arm 610 via an upper joint 614 and pivotally connected to the cleaning module 100 via a distal joint 104. The second connecting arm 630 is pivotally connected to the suspension arm 610 via a lower joint 616 and pivotally connected to the cleaning module 100 via a proximal joint 106. The lower joint is preferably provided slightly proximal relative to the upper joint.

The positioning of the various joints relative to one another and the lengths of the connecting arms is such that if either one of the connecting arms is moved to a position distal to that as shown by FIG. 6A, the cleaning module is moved away from the operational position to an idle position distal to the operating position, in which the cleaning module is tilted. This is shown in FIG. 6B.

As indicated, the movement of the cleaning module may be effectuated by driving one or both of the connecting arms. In the embodiment shown by FIG. 6A and FIG. 6B, the first connecting arm 620 is driven by means of a cam wheel 640 that is connected to the first connecting arm via a linking pin or pawl 642.

The pawl 642 may provide loosely provided and not rigidly to any of the first connecting arm 620 and the cam wheel 640. This means the pawl 642 is freely rotatable in holes or recesses provided in both the first connecting arm 620 and the cam wheel 640. Alternatively, the pawl 642 is fixedly connected to one or both of the first connecting arm and the cam wheel 640. For driving the first connecting arm 620, the cam wheel 640 is rotatably driven by means of a driving unit like an electromotor and a stepper motor in particular.

Whereas it has been indicated the suspension arm 610 is pivotally connected to the coffee machine 900 via the suspension joint 612, the suspension arm 610 may also be rigidly connected to the coffee machine. Hence, not swivelling of the suspension arm 610 has been shown by FIG. 6A and FIG. 6B. In an alternative embodiment in which the suspension arm 610 is swivelled, the swivelling movement of the suspension arm 610 by virtue of driving by the cam wheel 640 is determined by distances between the various joints.

Figure 7:
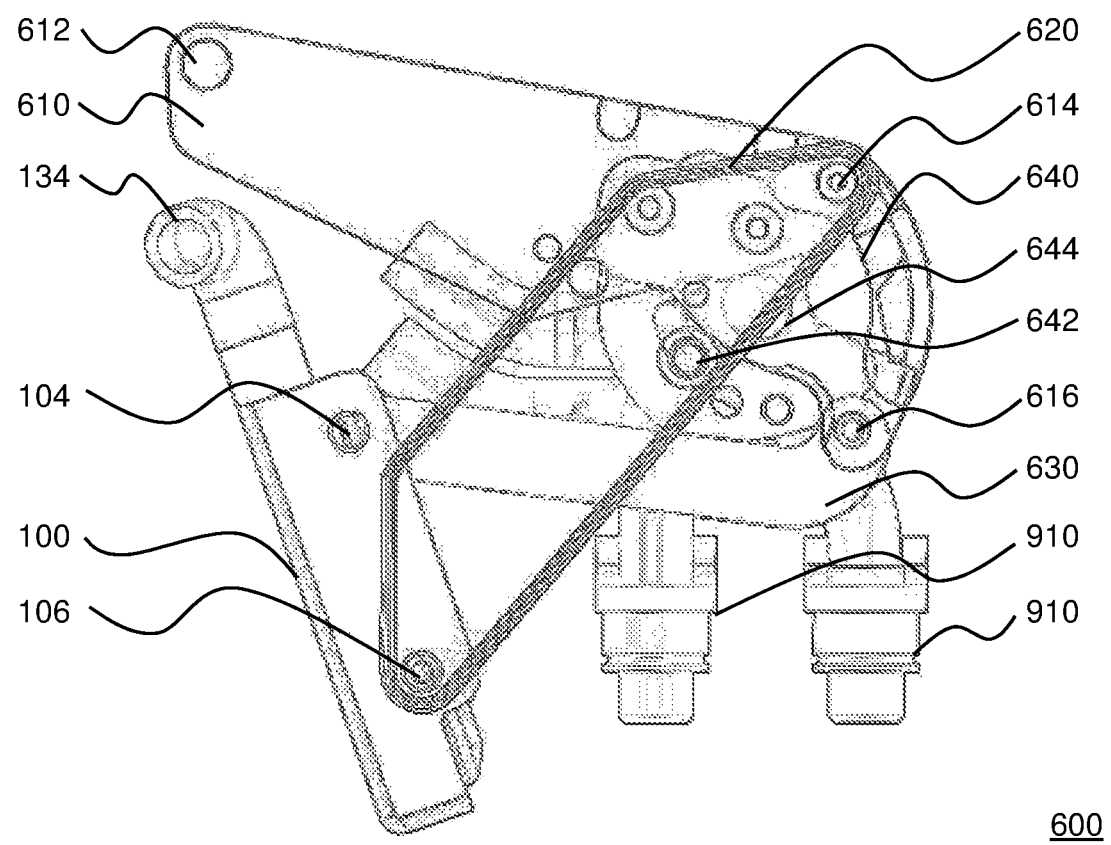
FIG. 7: shows a detailed view of the cleaning module movement system in idle position.

FIG. 7 provides a more detailed view of the cleaning module movement system 600 of which functionality will be discussed in further detail in conjunction with FIG. 8A, FIG. 8B, FIG. 8C and FIG. 8D.

FIG. 7 shows the cleaning module 100 in idle position, with the suspension arm 610 tilted downwardly relative to the position as shown by FIG. 6A. FIG. 7 also shows two nozzles 910. In FIG. 7, the cam wheel 610 is shown with a cam shaft 644 for connecting the cam wheel 610 to an electromotor comprised by the coffee machine 900. FIG. 7 furthermore shows the cleaning fluid collecting outlet 134. As the cleaning fluid collecting outlet 134 moves with the cleaning module 100, the cleaning fluid collecting outlet 134 is preferably connected to a reservoir or system outlet by means of a flexible duct like a tube or a hose.

Figure 8:
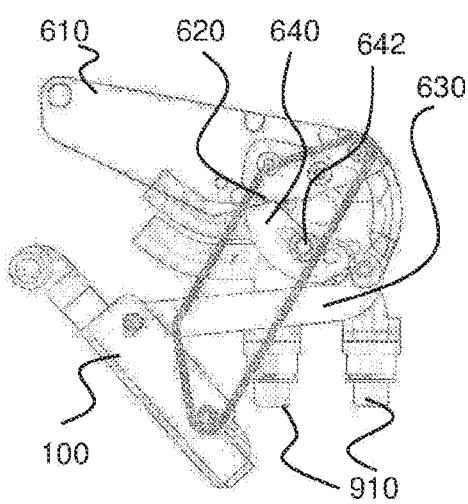
FIG. 8A: shows the cleaning module movement system in a first step moving from idle position to operating position.
FIG. 8B: shows the cleaning module movement system in a second step moving from idle position to operating position.
FIG. 8C: shows the cleaning module movement system in a third step moving from idle position to operating position.
FIG. 8D: shows the cleaning module movement system in operating position.
Figure 8:
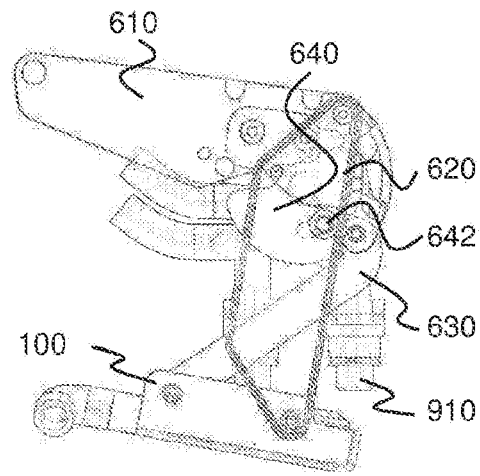
Figure 8:
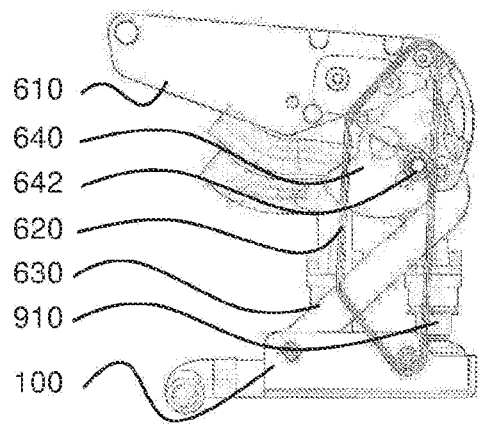
Figure 8:
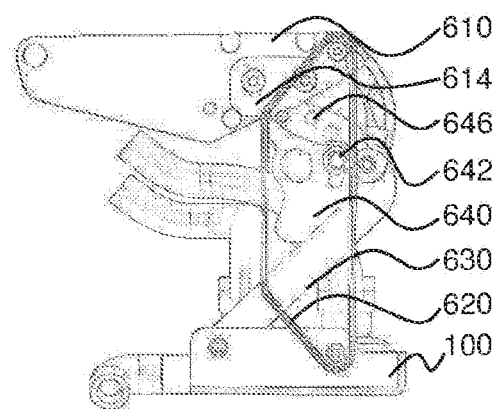

FIG. 8A shows the cam wheel 640 in a position rotated slightly counter-clockwise relative to the position as shown by FIG. 7. Via the pawl 642 fixed to the cam wheel 640 and provided in a recess in the first connecting arm 520, the first connecting arm 520 is slightly swivelled counter-clockwise and the cleaning module 100 is slightly moved away from the idle position and towards the operation position.

In the position depicted by FIG. 8B, the cam wheel 640 is rotated further counter-clockwise and the cleaning module 100 is in an almost horizontal position, in which the nozzle receptacle 120 is nearing the nozzle 910. In the position as depicted by FIG. 8C, the nozzle receptacle 120 and the opening of the spacer 140 is aligned with the nozzle 910. This means in this embodiment the cleaning module 100 is in a horizontal position. Furthermore, in the position as depicted by FIG. 8C, the nozzle 910 has not yet been received by the nozzle receptacle.

Receiving the nozzle 910 by the nozzle receptacle 120 is effectuated by further rotation of the cam wheel as depicted by FIG. 8D. by further rotation of the cam wheel 640, the first connecting arm 620 is driven such that the suspension arm 610 is lifted. While the suspension arm 610 is lifted, the first connecting arm 610 that is in almost vertical position lifts the cleaning module 100 such that the nozzle 910 is received by the nozzle receptacle 120. Preferably, the cam wheel 640 comprises a locking pin 646 that abuts against a locking plate 614 that is connected to the suspension arm 610. Upon abutment of the locking pin 646 to the locking plate 614, rotation of the cam wheel 640 in clockwise direction is prevented, without the cam wheel 640 being driven.

Figure 9:
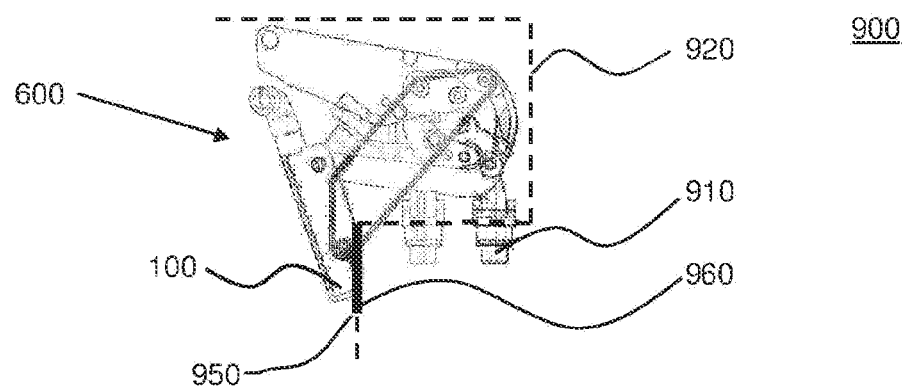
FIG. 9: shows the cleaning module movement system in the housing with a closing flap.

FIG. 9 shows a side view of the coffee machine with the cleaning module movement system 600 and the cleaning module 100 suspended in it. The cleaning module 100 is provided in the idle position. The outline of the housing 920 is schematically provided in a dashed line. In its idle position, the cleaning module 100 is at least partially housed in the housing 920. When moving to the operating position, the cleaning module 100 moves at least partially out of the housing 920. This means the housing 920 comprises an opening 950 through which the cleaning module is able to move.

For hygienic and esthetical purposes, the housing 920 is closed, at least when the cleaning module is in the idle position. To this purpose, a closing flap 960 is provided with the coffee machine 900 for closing off the opening 950 through which the cleaning module moves in and out of the housing 920. In the embodiment shown in FIG. 9, the closing flap 960 is connected to the cleaning module 100 such that if the cleaning module is in the idle position, the cleaning module 100, together with the closing flap 960 connected to it, closes off the opening 950. In another embodiment, the closing flap 960 is arranged to move independently, preferably driven by an independent driving module. Optionally, multiple closing flaps 960 may be provided.

Thus far, the cleaning module for cleaning the outside of the cleaning nozzle 910 is disclosed comprising a fluid guidance structure. It may be envisaged as well to provide a cleaning structure comprising multiple nozzles that spray a mist, cooperating with brushes for cleaning the exterior. Alternatively or additionally, a scraping tool may be provided for scraping residues from the nozzle exterior.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the Figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described.

The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. An apparatus for the preparation of a beverage having at least one beverage outlet nozzle for discharging the beverage into a beverage container, wherein the apparatus comprises:

a cleaning structure for cleaning an exterior surface of the beverage outlet nozzle, the cleaning structure being movably arranged relative to the beverage outlet nozzle, the cleaning structure moveable between an idle position allowing the beverage outlet nozzle to discharge the beverage into the beverage container and an operating position allowing cleaning of the beverage outlet nozzle, and the apparatus including a housing having at least one side wall, wherein the cleaning structure is moveable from the idle position which is substantially within the housing, via an opening in the side wall to the operating position, and the cleaning structure including a fluid guidance structure, the fluid guidance structure configured to guide a discharged cleaning fluid along the exterior surface of the beverage outlet nozzle when positioned at the beverage outlet nozzle, the fluid guidance structure including a nozzle receptacle for accommodating the beverage outlet nozzle and at least one cleaning fluid collecting inlet located above an outlet of the beverage outlet nozzle and arranged to receive the cleaning fluid after passage of the cleaning fluid along the exterior surface of the beverage outlet nozzle; and a sealing module arranged to provide a substantially fluid-tight seal between at least one of the housing of the apparatus and a part of the exterior surface of the beverage outlet nozzle spaced away from the outlet on one hand and the fluid guidance structure on the other hand, wherein the sealing module forms at least a part of the fluid guidance structure, and wherein the sealing module includes a resilient spacer positioned around the nozzle receptacle and the at least one cleaning fluid collecting inlet.

2. The apparatus according to claim 1, further comprising a flow shaping structure at a bottom of the nozzle receptacle.

3. The apparatus according to claim 1, wherein the cleaning fluid collecting inlet is provided adjacent to the nozzle receptacle.

4. The apparatus according to claim 1, wherein the sealing module is configured to enhance a sealing force, under influence of a fluid pressure of the cleaning fluid during operation.

5. The apparatus according to claim 4, wherein the sealing module is configured to expand under influence of a fluid pressure of the cleaning fluid during operation.

6. The apparatus according to claim 1, wherein the cleaning structure is spaced-apart from the exterior of the beverage outlet nozzle during nozzle cleaning.

7. The apparatus according to claim 1, wherein the apparatus further includes a movable cover member for covering the opening in the sidewall when the cleaning structure is located in its idle position within the housing.

8. The apparatus according to claim 1, wherein the cleaning structure is connected to a suspension arm via a first connecting arm and a second connecting arm; the first connecting arm being pivotally connected to an upper part of the suspension arm via an upper pivot point and pivotally connected to the cleaning structure via a first pivot point; the second connecting arm being pivotally connected to a lower part of the suspension arm via a second pivot point and pivotally connected to the cleaning structure via a second pivot point.

9. The apparatus according to claim 1, wherein the at least one cleaning fluid collecting inlet is located laterally adjacent to the nozzle receptacle.

10. The apparatus according to claim 1, wherein the at least one cleaning fluid collecting inlet faces the at least one of the housing of the apparatus and the part of the exterior surface of the beverage outlet nozzle spaced away from the outlet of the beverage outlet nozzle.

11. The apparatus according to claim 1, wherein the at least one cleaning fluid collecting inlet is spaced from the nozzle receptacle by a wall of the nozzle receptacle.

12. The apparatus according to claim 1, wherein the nozzle receptacle has a closed bottom.

13. An apparatus for the preparation of a beverage having at least one beverage outlet nozzle for discharging the beverage into a beverage container, wherein the apparatus comprises:

a cleaning structure for cleaning an exterior surface of the beverage outlet nozzle, the cleaning structure including a fluid guidance structure, the fluid guidance structure configured to guide a discharged cleaning fluid along the exterior surface of the beverage outlet nozzle when positioned at the beverage outlet nozzle, the fluid guidance structure including a nozzle receptacle for accommodating the beverage outlet nozzle and at least one cleaning fluid collecting inlet arranged to receive the cleaning fluid after passage of the cleaning fluid along the exterior surface of the beverage outlet nozzle; and a sealing module arranged to provide a substantially fluid-tight seal between at least one of a housing of the apparatus and a part of the exterior surface of the beverage outlet nozzle spaced away from an outlet opening on one hand and the fluid guidance structure on the other hand, wherein the sealing module forms at least a part of the fluid guidance structure, and wherein the sealing module includes a resilient spacer positioned around the nozzle receptacle and the at least one cleaning fluid collecting inlet;

wherein the cleaning structure is connected to a suspension arm via a first connecting arm and a second connecting arm; the first connecting arm being pivotally connected to an upper part of the suspension arm via an upper pivot point and pivotally connected to the cleaning structure via a first pivot point; the second connecting arm being pivotally connected to a lower part of the suspension arm via a second pivot point and pivotally connected to the cleaning structure via a second pivot point; and wherein the suspension arm is pivotally connected to the housing of the apparatus via an apparatus pivot point and the first connecting arm is suspended by and driven by a cam module comprising a cam provided on a cam shaft driven by a driving unit, the cam being arranged to drive the first connecting arm such to move the cleaning structure between an idle position and an operating position.

14. An apparatus for the preparation of a beverage having at least one beverage outlet nozzle for discharging the beverage into a beverage container, wherein the apparatus comprises:
- a cleaning structure for cleaning an exterior surface of the beverage outlet nozzle, the cleaning structure being movably arranged relative to the beverage outlet nozzle, the cleaning structure being moveable between an idle position allowing the beverage outlet nozzle to discharge the beverage into a beverage container and an operating position allowing cleaning of the beverage outlet nozzle;
- a housing having at least one side wall, wherein the cleaning structure is movable from the idle position in which the cleaning structure is located within the housing, via an opening in the side wall, to the operating position;
- wherein the cleaning structure is connected to a suspension arm via a first connecting arm and a second connecting arm; the first connecting arm being pivotally connected to an upper part of the suspension arm via an upper pivot point and pivotally connected to the cleaning structure via a first pivot point; the second connecting arm being pivotally connected to a lower part of the suspension arm via a second pivot point and pivotally connected to the cleaning structure via a second pivot point; and wherein the suspension arm is pivotally connected to the housing of the apparatus via an apparatus pivot point and the first connecting arm is suspended by and driven by a cam module comprising a cam provided on a cam shaft driven by a driving unit, the cam being arranged to drive the first connecting arm such to move the cleaning structure between the idle position and the operating position.

* * * * *